US009860696B2

(12) United States Patent
Watanabe

(10) Patent No.: US 9,860,696 B2
(45) Date of Patent: Jan. 2, 2018

(54) SYSTEM AND CONTROLLING METHOD

(71) Applicant: FUJITSU LIMITED, Kawasaki-shi, Kanagawa (JP)

(72) Inventor: Yuki Watanabe, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 309 days.

(21) Appl. No.: 14/579,383

(22) Filed: Dec. 22, 2014

(65) Prior Publication Data

US 2015/0193981 A1  Jul. 9, 2015

(30) Foreign Application Priority Data

Jan. 6, 2014  (JP) .................................. 2014-000532

(51) Int. Cl.
*G09G 5/00* (2006.01)
*H04W 4/02* (2009.01)
*H04W 4/00* (2009.01)
*H04W 4/20* (2009.01)

(52) U.S. Cl.
CPC .......... *H04W 4/021* (2013.01); *H04W 4/001* (2013.01); *H04W 4/20* (2013.01)

(58) Field of Classification Search
None
See application file for complete search history.

(56) References Cited

U.S. PATENT DOCUMENTS

| | | | | |
|---|---|---|---|---|
| 8,700,302 B2* | 4/2014 | Khosravy | .......... | G01C 21/3679 358/1.15 |
| 9,167,037 B2* | 10/2015 | Abe | ...................... | G01S 5/0263 |
| 9,222,787 B2* | 12/2015 | Blumenberg | .......... | G01C 21/32 |
| 9,332,387 B2* | 5/2016 | Davis | .................... | H04W 4/021 |
| 9,432,961 B2* | 8/2016 | Rao | ...................... | H04L 67/2847 |
| 2004/0203998 A1* | 10/2004 | Knauerhase | .......... | H04W 36/32 455/550.1 |
| 2006/0004512 A1* | 1/2006 | Herbst | ............... | G01C 21/3638 701/431 |
| 2008/0132249 A1* | 6/2008 | Hamilton | ............... | G01C 21/26 455/456.3 |

(Continued)

FOREIGN PATENT DOCUMENTS

| | | |
|---|---|---|
| JP | 2003-035544 | 2/2003 |
| JP | 2005-274348 A | 10/2005 |

OTHER PUBLICATIONS

Office Action dated Jun. 13, 2017 in Japanese Patent Application No. 2014-000532 (with machine generated English translation).

*Primary Examiner* — David H Chu
(74) *Attorney, Agent, or Firm* — Oblon, McClelland, Maier & Neustadt, L.L.P.

(57) ABSTRACT

A system includes circuitry configured to: acquire first display information corresponding to a first object included in image data captured by an apparatus, determine whether second display information corresponding to a second object, which is not included in the image data captured by the apparatus, is to be provided to the apparatus, acquire the second display information corresponding to the second object when it is determined that the second display information is to be provided to the apparatus, and transmit, to the apparatus, the first display information corresponding to the first object and the second display information corresponding to the second object.

19 Claims, 14 Drawing Sheets

(56) References Cited

U.S. PATENT DOCUMENTS

| | | | |
|---|---|---|---|
| 2010/0009713 A1* | 1/2010 | Freer | G06K 9/00979 455/556.1 |
| 2010/0010732 A1* | 1/2010 | Hartman | G01C 21/3484 701/532 |
| 2010/0149399 A1* | 6/2010 | Mukai | G01C 21/20 348/333.02 |
| 2010/0268451 A1* | 10/2010 | Choi | G01C 21/3602 701/533 |
| 2011/0052042 A1* | 3/2011 | Ben Tzvi | G06T 19/006 382/154 |
| 2012/0224060 A1* | 9/2012 | Gurevich | B60R 1/00 348/148 |
| 2012/0233025 A1* | 9/2012 | Calman | G06Q 10/00 705/26.61 |
| 2013/0286206 A1* | 10/2013 | Ozaki | H04N 7/18 348/148 |
| 2013/0328867 A1* | 12/2013 | Jung | G06T 19/006 345/419 |
| 2014/0063064 A1* | 3/2014 | Seo | G08G 1/166 345/633 |
| 2014/0092134 A1* | 4/2014 | Nagasawa | B60K 35/00 345/633 |
| 2014/0199980 A1* | 7/2014 | Rao | H04L 67/2847 455/418 |

\* cited by examiner

FIG. 6

| SCENARIO ID | SCENARIO NAME | DETAILS |
|---|---|---|
| 1 | ROUTE A | THIS IS SCENARIO OF ROUTE A. |
| 2 | ROUTE B | THIS IS SCENARIO OF ROUTE B. |
| ... | ... | ... |

| MARKER ID | SCENARIO ID | NETWORK | SEQUENCE |
|---|---|---|---|
| 1 | 1 | ONLINE | 1 |
| 2 | 1 | ONLINE | 2 |
| 3 | 1 | OFFLINE | 3 |
| 4 | 1 | OFFLINE | 4 |
| 5 | 1 | ONLINE | 5 |
| 6 | 1 | OFFLINE | 6 |
| 7 | 2 | ONLINE | 1 |
| 8 | 2 | OFFLINE | 2 |
| ... | ... | ... | ... |

FIG. 9

| SUPERIMPOSITION INFORMATION ID | SCENARIO ID | MARKER ID | SUPERIMPOSING INFORMATION |
|---|---|---|---|
| 1 | 1 | 1 | image.png |
| 2 | 1 | 2 | "NEXT, IT IS OFFLINE" |
| 3 | 1 | 3 | "DANGER" |
| 4 | 1 | 4 | "!" |
| 5 | 1 | 5 | Photo.jpg |
| 6 | 1 | 6 | "END" |
| ... | ... | ... | ... |

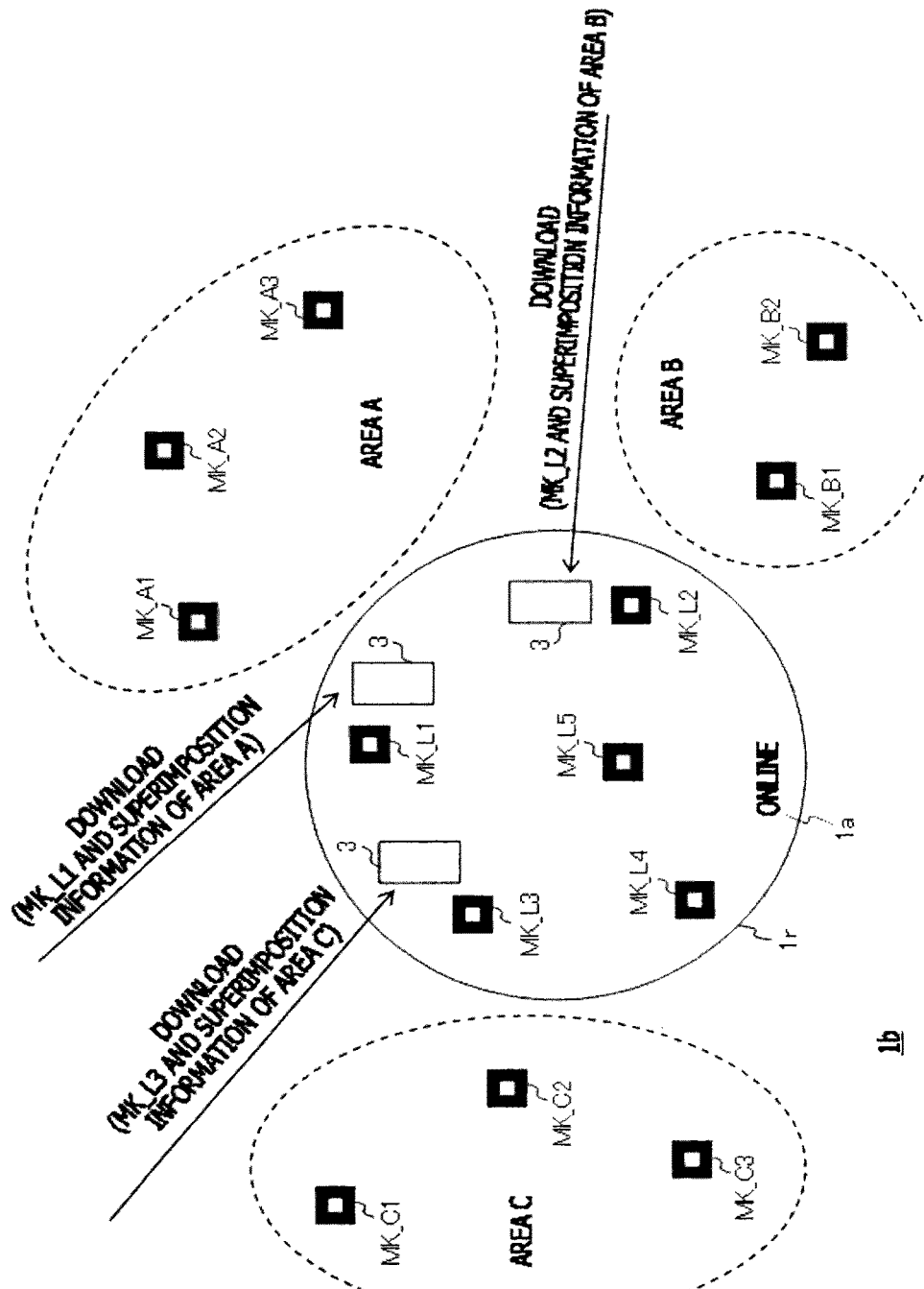

SYSTEM AND CONTROLLING METHOD

CROSS-REFERENCE TO RELATED APPLICATION

This application is based upon and claims the benefit of priority of the prior Japanese Patent Application No. 2014-000532, filed on Jan. 6, 2014, the entire contents of which are incorporated herein by reference.

FIELD

The embodiments discussed herein are related to a control of a service that supplies information.

BACKGROUND

A wireless communication service exists, that supplies information by detecting a marker by using a user terminal. In the service, information denoting a position where the marker is disposed is supplied by a server apparatus. In addition, information that is supplied in accordance with the detection of the marker is uploaded to the server apparatus from the user terminal.

Japanese Laid-open Patent Publication No. 2003-035544 discusses a navigation aid apparatus that acquires map information by using wireless data communication. It is not possible for the navigation aid apparatus to acquire map data while outside a radio zone. Thus, a configuration is known in which, when the navigation aid apparatus approaches a non-communication area that is searched for in advance, map information corresponding to the non-communication area is downloaded in order to ensure that the navigation aid is not disabled.

SUMMARY

According to an aspect of the invention, a system includes circuitry configured to: acquire first display information corresponding to a first object included in image data captured by an apparatus, determine whether second display information corresponding to a second object, which is not included in the image data captured by the apparatus, is to be provided to the apparatus, acquire the second display information corresponding to the second object when it is determined that the second display information is to be provided to the apparatus, and transmit, to the apparatus, the first display information corresponding to the first object and the second display information corresponding to the second object.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of data of a scenario table;

FIG. 7 is a diagram illustrating an example of data of a marker table;

FIG. 9 is a diagram illustrating examples of data of a defined superimposition information table;

FIG. 14 is a diagram illustrating an example of supplying information to offline areas.

DESCRIPTION OF EMBODIMENTS

Figure 1:
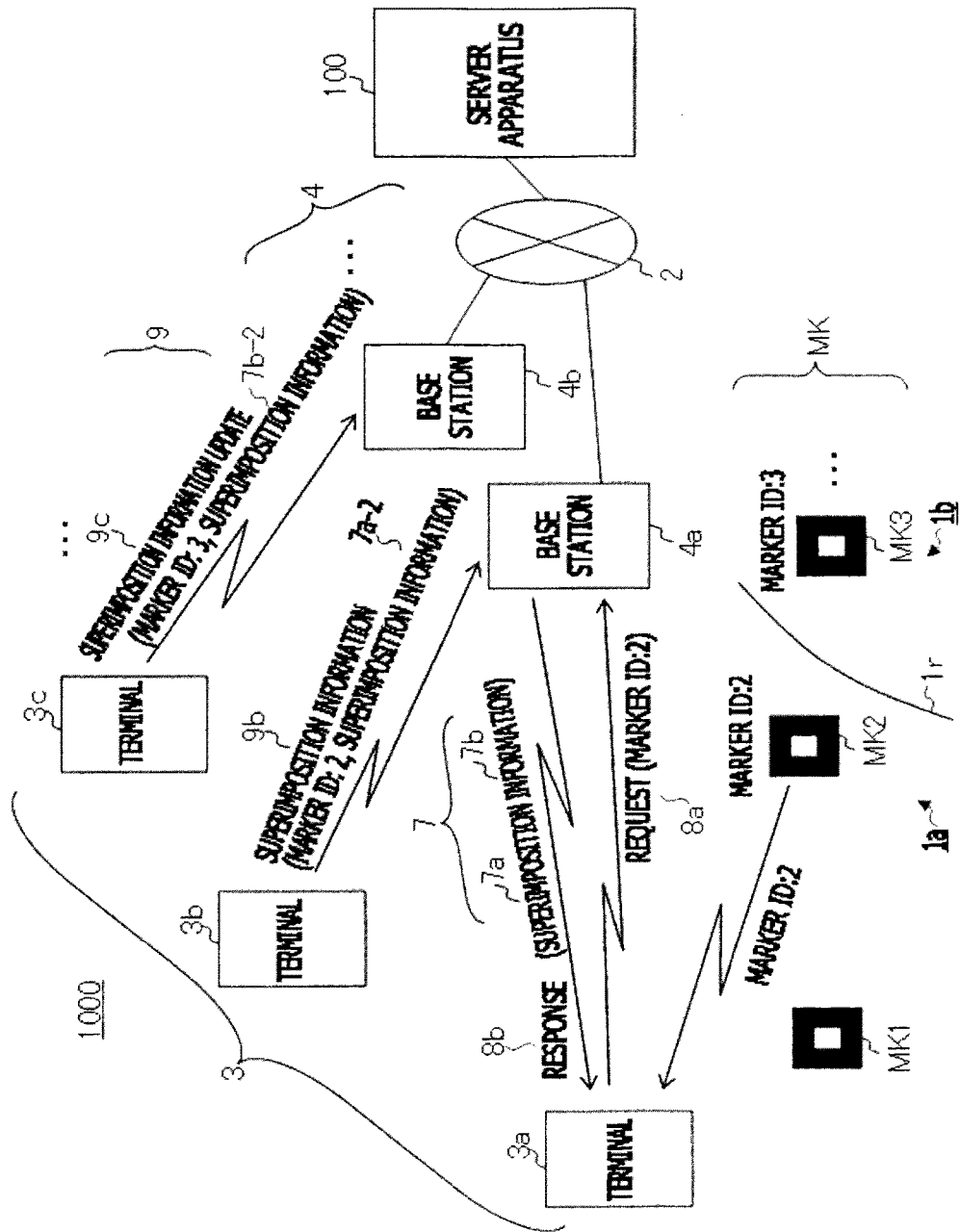
FIG. 1 is a diagram illustrating an example of an entire configuration of an information supplying system.

It is considered that information to be supplied is downloaded in advance for a marker disposed outside a radio zone in order to supply the information in accordance with marker detection by a terminal apparatus (hereinafter "terminal"). However, in a case where a user downloads information corresponding to a marker, and then another user updates the information, the old information is eventually supplied in accordance with the marker detection.

In order to download information obtained immediately before the terminal reaches the outside of the radio zone, there is an option to consider causing the terminal to continuously transmit positional information obtained by a Global Positioning System (GPS) or the like to a server apparatus that manages the information. However, a load imposed on the terminal or server apparatus increases.

According to an aspect, an object of the technology disclosed in the present example is to enable a terminal to acquire information corresponding to a marker outside of a radio zone, immediately before the terminal reaches the outside of the radio zone.

Hereinafter, embodiments of the disclosure are described with reference to the drawings. A service that supplies information in accordance with the detected reference object when a user terminal apparatus (hereinafter "user terminal") detects a reference object, such as a marker. A technology referred to as augmented reality (AR) is an example of such a service.

It is possible to display, using AR technology, a 3D model created by computer-aided design (CAD) or the like on a screen on which an image captured by a camera is displayed, such that the 3D model seems to be present in the same space where the camera performs capturing. In the following description, detection using a marker is described as an example, but the AR technology includes detection using a marker, object recognition, or the like.

In a case of using AR, the user terminal communicates with the server apparatus at the time of detecting the marker, downloads information associated with the reference object from the server apparatus, and displays the information on the screen.

The downloaded information is information (superimposition information) that is superimposed on the captured image (still or moving image) by the terminal using a camera. The information (superimposition information) can be an image, character information, or audio data, such as that of sound, music or the like, but may be a combination thereof.

According to the present embodiment, in a case of an environment where the navigation aid is close to the boundary of the radio zone, the terminal downloads the superimposition information from the server apparatus and superimposes the downloaded superimposition information on the displayed image in accordance with the detection of the markers that are online. In addition, in a case where the terminal detects a marker in an online area close to a boundary between the inside and outside of the radio zone, the server apparatus causes the terminal to download another item of superimposition information associated with a marker disposed outside the radio zone.

In general, "online" means a state in which a terminal is positioned inside a radio zone and it is possible to perform radio communication. However, according to the present embodiment, "online" refers to a region where it is possible to perform radio communication. In general, "offline" means a state in which a terminal is positioned outside a radio zone and it is not possible to perform radio communication. However, according to the present embodiment, "offline" refers to a region where it is not possible to perform radio communication.

Next, an information supplying system according to the present embodiment is described with reference to FIG. 1. FIG. 1 is a diagram illustrating an example of an entire configuration of an information supplying system. An information processing system 1000 illustrated in FIG. 1 includes a server apparatus 100, a plurality of terminals 3a, 3b, 3c . . . (collectively called terminal 3), a plurality of base stations 4a, 4b . . . (collectively called base station 4), and a plurality of markers MK1, MK2, MK3 . . . (collectively called marker MK).

The plurality of base stations 4 are connected to the server apparatus 100 via internet 2. In addition, the plurality of terminals 3 perform wireless network communication with the base stations 4 and thereby are connected to the server apparatus 100 via the internet 2 from the base stations 4.

Each of the terminals 3 is capable of communication and functions as a portable information processing terminal. The terminal 3 can be a mobile phone, a personal digital assistant (PDA), or the like, supports a communication function that controls network communication or the like, and has a camera function of. It is preferable that the function of the camera include a reading function for reading a two-dimensional bar code pattern. It is preferable that the communication function of the terminal include a short-distance radio communication function through non-contact radio communication or the like, in addition to network communication via the internet 2 or the like.

Each marker MK retains a marker ID for its identification. The marker ID may be displayed as a two-dimensional bar code pattern that is read by the terminals 3, or in a case where the markers MK have IC chips that make short-distance radio communication possible, the terminals 3 may be configured such that the marker ID can be acquired from a volatile memory of the marker MK by non-contact radio communication. In this case, a radio frequency (RF) tag or the like that includes an integrated circuit (IC) is used as the marker MK.

An outline of a superimposition information acquisition process is described in a case where the terminal 3a acquires superimposition information 7a. The terminal 3a performs short-distance wireless communication with the marker MK2 and acquires marker ID "2" from the marker MK2. The terminal 3a transmits a request 8a that designates the acquired marker ID "2" to the server apparatus 100. The marker ID "2" is transmitted from the terminal 3a through the base station 4a and the internet 2 to the server apparatus 100.

The server apparatus 100 supplies a response 8b that includes the superimposition information 7a corresponding to the marker ID "2" received by the request 8a to the terminal 3a that transmits the marker ID "2". When the superimposition information 7a is supplied using response 8b, the server apparatus 100 causes superimposition information 7b of the marker MK3 disposed in offline 1b area to be included in the response 8b and supplies the superimposition information 7b to the terminal 3a, in a case where the server apparatus 100 determines that the terminal 3a is positioned at the marker MK2 (in the online 1a area of a boundary 1r between the online is area and the offline 1b area) disposed within the online is but close to the offline 1b area that the terminal 3a enters from the online is area, in accordance with the marker ID "2".

When the superimposition information 7a (and the superimposition information 7b) is downloaded from the server apparatus 100, the terminal 3a superimposes the superimposition information 7a corresponding to the marker ID "2" detected from the marker MK2 on a displayed image. Hereinafter, the items of superimposition information 7a, 7b, and the like are simply referred to as superimposition information 7.

Subsequently, an outline of a superimposition information updating process is described in a case where the terminal 3b updates the superimposition information 7. The terminal 3b designates the marker ID "2" that specifies the marker MK2 with respect to the server apparatus 100, and transmits superimposition information update 9b that includes updating superimposition information 7a-2 to the server apparatus 100. The server apparatus 100 updates the superimposition information 7a to the updating superimposition information 7a-2 with respect to the marker ID "2".

The terminal 3c designates a marker ID "3" that specifies the marker MK3 with respect to the server apparatus 100, and transmits superimposition information update 9c that includes updating superimposition information 7b-2 to the server apparatus 100. The server apparatus 100 updates the superimposition information 7b to the updating superimposition information 7b-2 with respect to the marker ID "3". Hereinafter, the superimposition information updates 9b and 9c are simply referred to as superimposition information update 9.

The above-described updating process is provided as an example, and each item of superimposition information 7 can be updated by any terminal 3 at any time.

Figure 2:
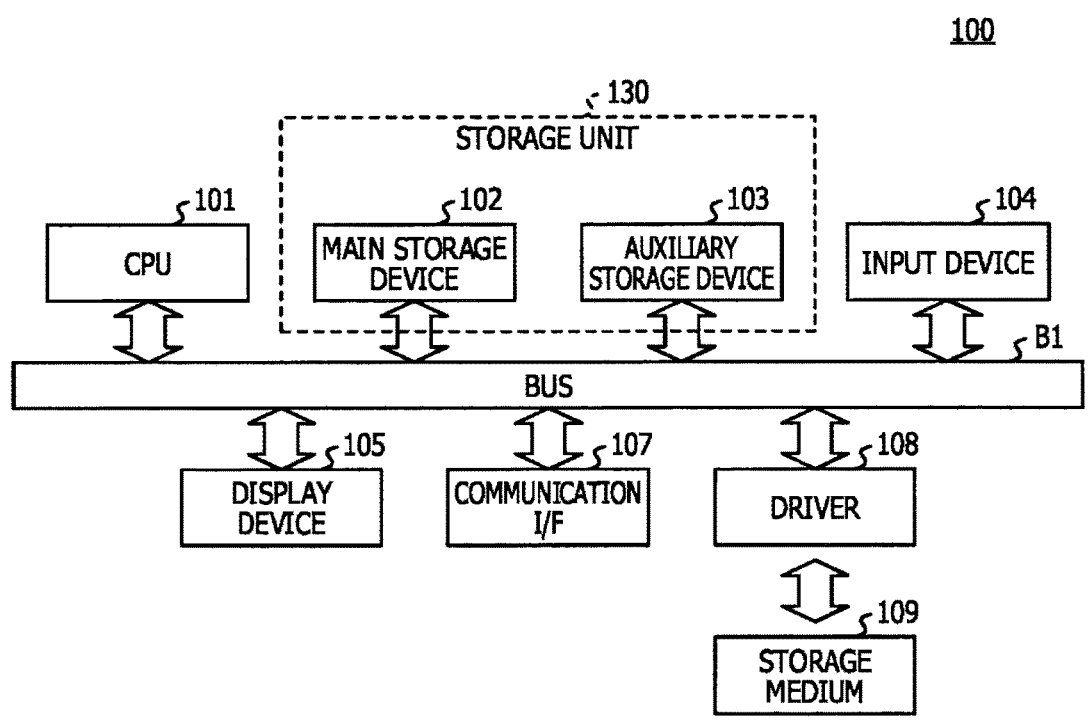
FIG. 2 is a diagram illustrating a hardware configuration of a server apparatus.

The server apparatus 100 according to the present embodiment has a hardware configuration as illustrated in FIG. 2. FIG. 2 is a diagram illustrating a hardware configuration of the server apparatus. In FIG. 2, the server apparatus 100 is a terminal that is controlled by a computer, includes a central processing unit (CPU) 101, a main storage device 102, an auxiliary storage device 103, an input device 104, a display device 105, a communication interface (I/F) 107, and a drive 108, and is connected to a bus B1.

The CPU 101 is a processor that controls the server apparatus 100 according to a program stored in the main storage device 102. A random access memory (RAM), a read-only memory (ROM), or the like is used as the main storage device 102, and a program that is executed in the CPU 101, data for a process in the CPU 101, data obtained in the process of the CPU 101, or the like is stored or temporarily retained in the main storage device 102.

A hard disk drive (HDD) or the like is used as the auxiliary storage device 103, and data for a program to execute various processes is stored in the auxiliary storage device 103. Some programs stored in the auxiliary storage device 103 are loaded to the main storage device 102 and are executed by the CPU 101 and thereby the various processes are realized. A storage unit 130 includes the main storage device 102 and/or the auxiliary storage device 103.

The input device 104 includes a mouse, a keyboard, or the like, and is used by a server administrator to input various types of information for a process of the server apparatus 100. The display device 105 displays various types of information for a control of the CPU 101. The communication I/F 107 performs communication through a wired or wireless network.

The program to realize the process performed by the server apparatus 100 is supplied to the server apparatus 100 by a storage medium 109, such as a compact disc read-only memory (CD-ROM). The drive 108 interfaces the storage medium 109 set in the drive 108 with the server apparatus 100.

In addition, the program realizing the various processes according to the present embodiment to be described later is stored on the storage medium 109, and the program stored on the storage medium 109 is installed in the server apparatus 100 through the drive 108. The installed program can be executed by the server apparatus 100.

A medium on which the program is stored is not limited to a CD-ROM, but may be any medium that can be read by a computer. Examples of a computer readable storage medium include a DVD disc, a portable recording medium, such as a USB memory, or a semiconductor memory, such as flash memory, in addition to a CD-ROM.

Figure 3:
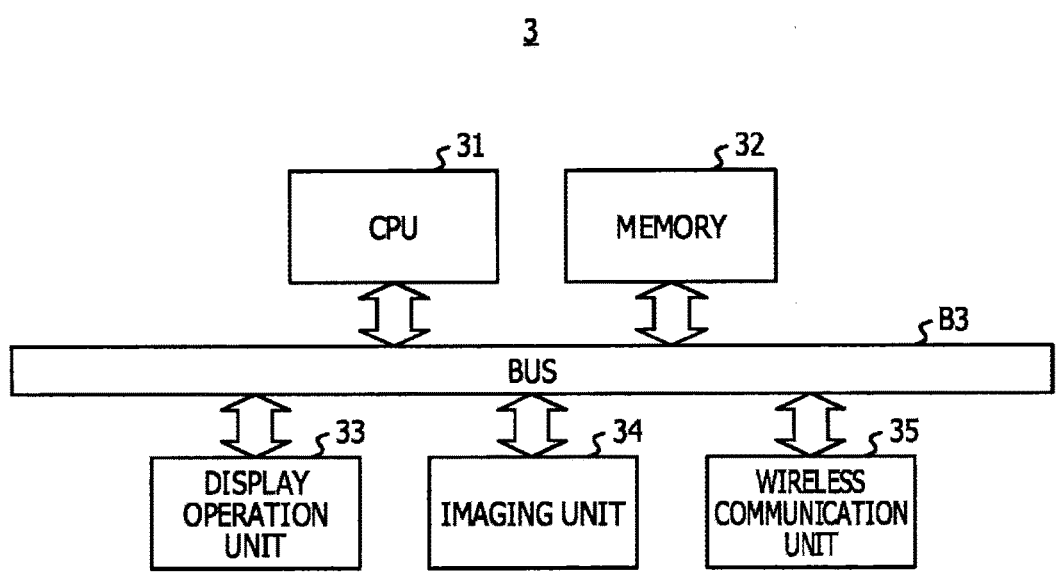
FIG. 3 is a diagram illustrating a hardware configuration of a terminal.

In addition, the terminal 3 according to the present embodiment has a hardware configuration as illustrated in FIG. 3. FIG. 3 is a diagram illustrating the hardware configuration of the terminal. In FIG. 3, the terminal 3 is a terminal that is controlled by a computer, includes a CPU 31, a memory 32, a display operation unit 33, an imaging unit 34, and a wireless communication unit 35, and is connected to the bus B3.

The CPU 31 is a processor that controls the terminal 3 according to a program stored in the memory 32. A random access memory (RAM), a read-only memory (ROM), or the like is used as the memory 32, and a program that is executed in the CPU 31, data for a process in the CPU 31, data obtained in the process in the CPU 31, or the like is stored or temporarily retained in the memory 32.

The display operation unit 33 includes a display section and an operation section. The display operation unit 33 may be a touch panel or the like in which the display section and the operation section are integrated. The display operation unit 33 displays various types of information for control of the CPU 31 and receives input of various types of information by a user.

The imaging unit 34 corresponds to a camera that captures still or moving images. The image captured by the imaging unit 34 is displayed on the display operation unit 33. In addition, in a case where the marker ID appears as a QR Code®, the imaging unit 34 is used as a reader that reads the QR code.

The wireless communication unit 35 performs network communication to communicate with the server apparatus 100. The wireless communication unit 35 may further perform short-distance wireless communication.

A program to realize a process performed by the terminal 3 is stored in the memory 32 in advance, and may be supplied to a user at the time of purchasing the terminal 3, or it may be downloaded to the terminal 3 from the server apparatus 100 via an internet service provider who administers the server apparatus 100 to make the terminal usable.

Figure 4:
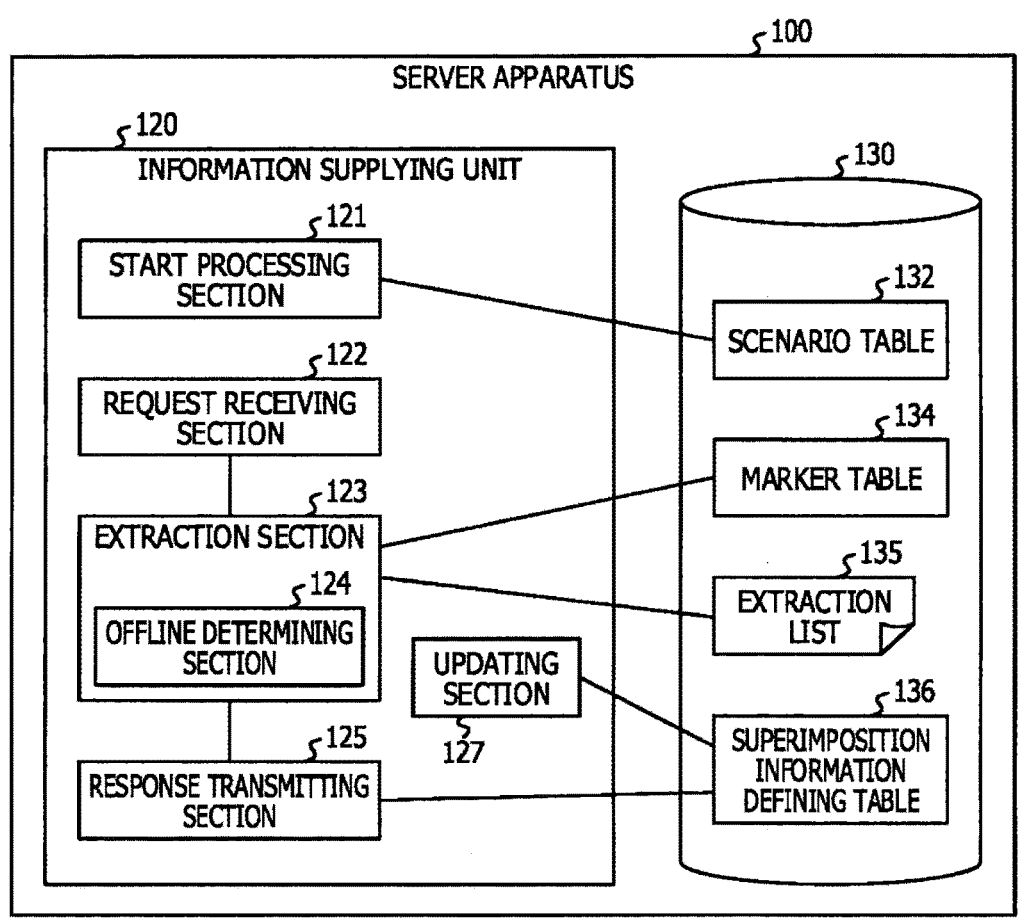
FIG. 4 is a diagram illustrating an example of a functional configuration of the server apparatus.

Next, the server apparatus 100 is described. FIG. 4 is a diagram illustrating an example of a functional configuration of the server apparatus. In FIG. 4, the server apparatus 100 includes an information supplying unit 120 that supplies the superimposition information 7 in accordance with a scenario, to the terminal 3.

The scenario is information which has a plurality of markers MK, and in which a sequence is established for the terminal 3 to detect each marker MK (or will detect). One scenario indicates a route of the terminal 3.

The information supplying unit 120 includes a start processing section 121, a request receiving section 122, an extraction section 123, a response transmitting section 125, and an updating section 127. Each of the processing sections of the start processing section 121, the request receiving section 122, the extraction section 123 that includes an offline determining section 124, the response transmitting section 125, and the updating section 127 is realized by the processes performed by executing the corresponding programs by the CPU 101. In addition, these processing sections 121 to 125, and 127 may be realized by hardware, such as a circuit.

In addition, the storage unit 130 stores a scenario table 132, a marker table 134, an extraction list 135, and a defined superimposition information table 136.

When the start processing section 121 receives a start request from the terminal 3, the start processing section 121 supplies scenario information related to a scenario selected by a user of the terminal 3 to the terminal 3 with reference to the scenario table 132.

The request receiving section 122 receives a request from the terminal 3 after the scenario is started.

The extraction section 123 appoints the superimposition information 7 that is to be downloaded to the terminal 3 according to the marker ID that is included in the request received by the request receiving section 122. The extraction section 123 further includes the offline determining section 124.

The offline determining section 124 determines whether or not the current marker MK corresponds to the boundary $1r$ with reference to the marker table 134 using the marker ID that is included in the request. In a case where the offline determining section 124 determines that the current marker MK corresponds to the boundary $1r$, the extraction section 123 extracts the marker IDs of the current marker MK and the marker MK in the offline $1b$ area from the marker table 134. The extraction list 135 that lists the extracted marker IDs is stored in the storage unit 130.

The response transmitting section 125 acquires the superimposition information 7 associated with the marker ID that is extracted by the extraction section 123 from the defined superimposition information table 136, includes the superimposition information 7 in the response, and transmits the superimposition information 7 to the terminal 3.

The updating section 127 updates the defined superimposition information table 136 in accordance with the superimposition information update $9b$ of the terminal 3.

Figure 5:
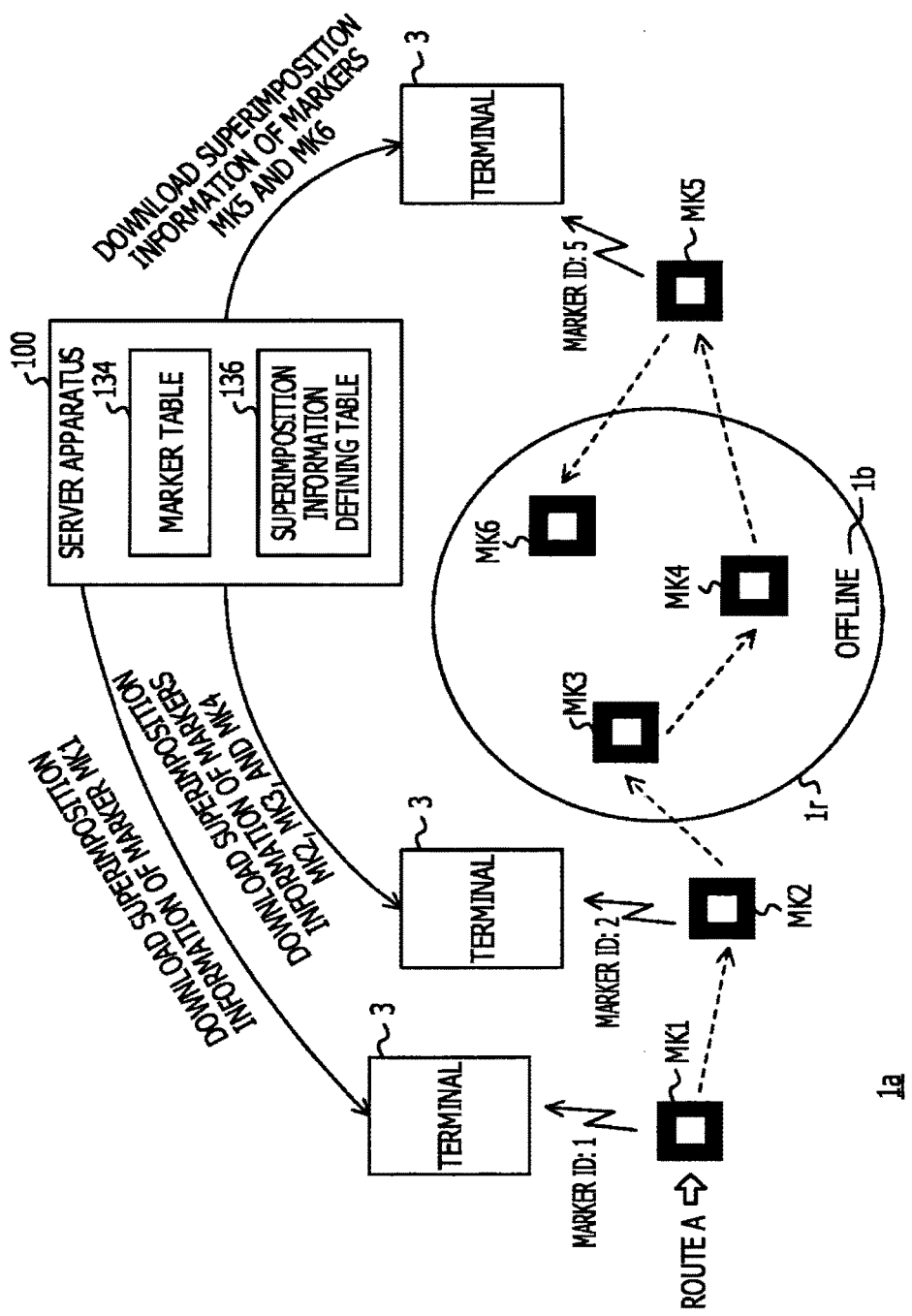
FIG. 5 is a diagram illustrating an example of a scenario.

Subsequently, the server apparatus 100 is described with reference to FIGS. 5 to 10. First, various examples of data stored in the storage unit 130 are described using a case of a scenario of a route A illustrated in FIG. 5. FIG. 5 is a diagram illustrating an example of the scenario. In the scenario illustrated in FIG. 5, the route A in which the terminal 3 detects the marker IDs in the sequence of markers MK1, MK2, MK3, MK4, MK5, and MK6 is illustrated. In the route A, the markers MK1, MK2, and MK5 are disposed in the online is area, and the markers MK3, MK4, and MK6 are disposed in the offline 1*b* area. The markers MK1, MK2, MK3, MK4, MK5, and MK6 retain marker IDs "1", "2", "3", "4", "5", and "6", respectively.

The terminal 3 acquires the marker IDs in the sequence starting from the marker MK1. When the terminal 3 detects the marker ID "1" from the marker MK1, the terminal 3 transmits the marker ID "1" to the server apparatus 100, and thereby the superimposition information 7 of the marker MK1 is downloaded. The downloaded superimposition information 7 is displayed on the display operation unit 33 of the terminal 3. When the terminal 3, then, detects the marker ID "2" from the marker MK2, the terminal 3 transmits the marker ID "2" to the server apparatus 100.

In the route A, the markers MK3 and MK4 are disposed in the offline 1*b* area, and the marker MK5 is disposed in the online is area. The server apparatus 100 determines that the terminal 3 moves from the online 1*a* area to the marker MK3 in the offline 1*b* area, with reference to the marker table 134 in accordance with the marker ID "2". As a result, the server apparatus 100 supplies the items of superimposition information of the markers MK2, MK3, and MK4 from the defined superimposition information table 136 to the terminal 3. That is, the server apparatus 100 causes the items of superimposition information of the markers MK3 and MK4, in addition to the superimposition information of the marker MK2 to be downloaded to the terminal 3.

The terminal 3 causes the downloaded superimposition information of the marker MK2 to be superimposed on the image displayed on the display operation unit 33, and causes the items of superimposition information of the markers MK3 and MK4 to be stored in the memory 32.

When the terminal 3 moves from the online 1*a* area into the offline 1*b* area, and detects the marker ID "3" of the marker MK3, the terminal 3 reads the superimposition information of the marker MK3 in the memory 32 and displays the superimposition information on the display operation unit 33.

The terminal 3 moves to the marker MK4. The position of the marker MK4 is still in the offline 1*b* area. Therefore, when the terminal 3 detects the marker ID "4" of the marker MK4, the terminal 3 reads out the superimposition information of the marker MK4 from the memory 32 and displays the superimposition information on the display operation unit 33.

The terminal 3 moves from the offline 1*b* area to the online is area, detects the marker ID "5" of the marker MK5, and transmits the marker ID "5" to the server apparatus 100.

In this case, the server apparatus 100 determines that the terminal 3 moves from the offline 1*b* area to the marker MK5 in the online is area, with reference to the marker table 134 in accordance with the marker ID "5" received from the terminal 3. As a result, the server apparatus 100 supplies items of superimposition information of the markers MK5 and MK6 from the defined superimposition information table 136 to the terminal 3. That is, the server apparatus 100 causes the superimposition information of the marker MK6, in addition to the superimposition information of the marker MK5 to be downloaded to the terminal 3.

The terminal 3 causes the downloaded superimposition information of the marker MK5 to be superimposed on the image displayed on the display device 105, and causes the superimposition information of the marker MK6 to be stored in the memory 32.

When the terminal 3 moves from the online is area into the offline 1*b* area, and detects the marker ID "6" of the marker MK6, the terminal 3 reads out the superimposition information of the marker MK6 from the memory 32 to be displayed on the display device 105.

FIG. 6 is a diagram illustrating an example of data of a scenario table. In FIG. 6, the scenario table 132 has categories, such as scenario ID, scenario name, and details. Each scenario ID is associated with a corresponding scenario name and details.

The scenario ID indicates an ID that can be used to identify a scenario. The scenario name is a name of the scenario, and the details are an explanation of the scenario. For example, the scenario ID "1" is the scenario name of the "route A", and the details provide an explanation of "This is a scenario of route A". Hereinafter, each scenario ID has both a scenario name and details.

When a user selects a scenario of the scenario ID "1" in the terminal 3, the server apparatus 100 transmits the details, "This is a scenario of route A." to the terminal 3. The user sees that the selected scenario is the scenario of the route A on the terminal 3.

FIG. 7 is a diagram illustrating an example of data of the marker table. In FIG. 7, the marker table 134 has categories, such as marker ID, scenario ID, network, and sequence. Each marker ID, or each combination of a marker ID and a scenario ID is associated with a corresponding network and sequence.

The marker ID indicates an ID that identifies a marker MK. The scenario ID indicates an ID that is used to identify a scenario. The network indicates whether the marker MK is disposed in the online is area or in the offline 1*b* area. In a case where the marker MK is disposed in the online is area, "online" appears. In a case where the marker MK is disposed in the offline 1*b* area, "offline" appears. The sequence indicates the sequence of movements of the terminal 3 in the same scenario, that is, the sequence in which the markers MK are detected by the terminal 3.

An example of data of the marker table 134 in FIG. 7 illustrates that the marker MK with the marker ID "1" belongs to a scenario with the scenario ID "1", is disposed in the online 1*a* area, and is detected first by the terminal 3 in the same scenario. It is illustrated that the marker MK with the marker ID "2" belongs to the scenario with the scenario ID "1", is disposed in the online 1*a* area, and is detected second by the terminal 3 in the same scenario.

It is illustrated that the markers MK with the marker IDs "3" and "4" belong to the scenario with the scenario ID "1", but are disposed in the offline 1*b* area, and are detected third and fourth by the terminal 3 in the same scenario.

It is illustrated that the marker MK with the marker ID "5" belongs to the scenario with the scenario ID "1", is disposed in the online is area, and is detected fifth by the terminal 3 in the same scenario.

It is illustrated that the marker MK with the marker ID "6" belongs to the scenario with the scenario ID "1", is disposed in the offline 1*b* area, and is detected sixth by the terminal 3 in the same scenario.

The network and sequence of the markers MK that belong to other scenarios are managed in the marker table 134.

Figure 8A:
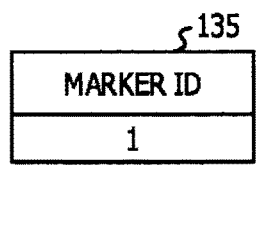
FIGS. 8A, 8B and 8C are diagrams illustrating examples of data of extraction lists.
Figure 8B:
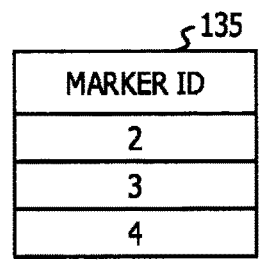
Figure 8C:
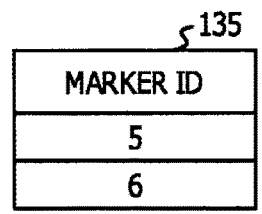

FIGS. 8A, 8B and 8C are diagrams illustrating examples of data of extraction lists. FIG. 8A illustrates an example of the data of the extraction list 135 in a case where there is a request for the superimposition information 7 corresponding to the marker ID "1" from the terminal 3 in the route A of FIG. 5. In this case, the marker ID "1" appears only on the extraction list 135.

FIG. 8B illustrates an example of the data of the extraction list 135 in a case where there is a request for the superimposition information 7 corresponding to the marker ID "2" from the terminal 3 in the route A of FIG. 5. In this case, the marker IDs "2", "3", and "4" appear on the extraction list 135.

FIG. 8C illustrates an example of the data of the extraction list 135 in a case where there is a request of the superimposition information 7 corresponding to the marker ID "5" from the terminal 3 in the route A of FIG. 5. In this case, the marker IDs "5" and "6" appear on the extraction list 135.

FIG. 9 is a diagram illustrating examples of data of a defined superimposition information table. In FIG. 9, the defined superimposition information table 136 has categories, such as superimposition information ID, scenario ID, marker ID, and superimposition information. Each superimposition information ID is associated with a corresponding scenario ID, marker ID, and superimposition information.

The superimposition information ID indicates an ID that is used to identify the superimposition information 7. The scenario ID indicates an ID that is used to identify a scenario. The marker ID indicates an ID that is used to identify a marker. The superimposition information stores the superimposition information 7. The superimposition information may be an entity of the superimposition information 7, or may be a pointer to open a storage area where the superimposition information 7 is stored.

The examples of data of the defined superimposition information table 136 in FIG. 9 illustrate that the superimposition information 7 with a superimposition information ID "1" belongs to the scenario with the scenario ID "1" and corresponds to the marker MK with the marker ID "1". In addition, the superimposition information 7 with the superimposition information ID "1" is the file "image.png". In the terminal 3, image.png of the superimposition information 7 is superimposed on the image displayed on the display operation unit 33. Similarly, other items of superimposition information 7 are defined.

The superimposition information 7 with the superimposition information ID "1" is an image, but the superimposition information 7 with a superimposition information ID "2" may be text such that "Next, it is offline" appears. In the examples of the data of FIG. 9, the superimposition information 7 is an image, text, a sign, or the like, but is not limited thereto.

The server apparatus 100 extracts the superimposition information 7 from the defined superimposition information table 136 in FIG. 9 in accordance with the extraction list 135 illustrated in any one of FIGS. 8A to 8C and supplies the superimposition information 7 to the terminal 3.

Figure 10:
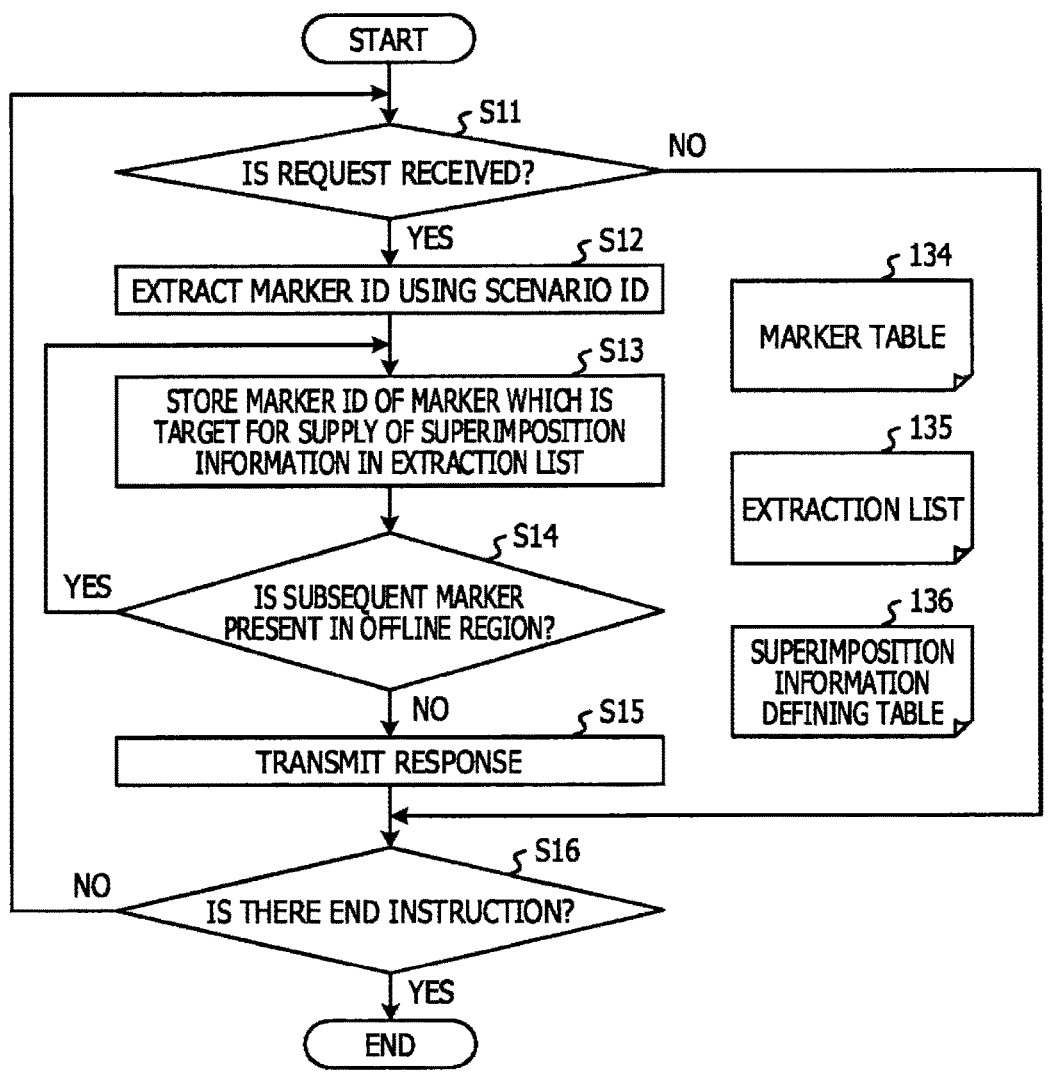
FIG. 10 is a flowchart diagram illustrating an information supplying process that is performed by the server apparatus.

Next, an information supplying process that is performed by the information supplying unit 120 of the server apparatus 100 is described. FIG. 10 is a flowchart diagram illustrating the information supplying process that is performed by the server apparatus. In FIG. 10, in the information supplying unit 120 of the server apparatus 100, the request receiving section 122 determines whether or not the request 8a is received from the terminal 3 (step S11).

In a case where the request receiving section 122 determines that the request 8a has not been received ("NO" in step S11), the request receiving section 122 determines whether or not an end instruction has been received from the terminal 3 (step S16). In a case where the request receiving section 122 determines that the end instruction has been received ("YES" in step S16), the information supplying unit 120 ends the information supplying process. In a case where the request receiving section 122 determines that the end instruction has not been received ("NO" in step S16), the process returns to step S11, and the above-described processes are repeated.

Meanwhile, in a case where the request receiving section 122 determines that the request 8a has been received ("YES" in step S11), the extraction section 123 extracts the marker ID using the scenario ID (step S12). The extraction section 123 extracts a record of marker IDs of one or a plurality of markers MK that belong to the same scenario from the marker table 134 by using a scenario ID of a scenario selected by a user. In the example of data of the marker table 134 in FIG. 7, in a case where a user selects a scenario with the scenario ID "1", a record that illustrates the scenario ID "1" is extracted.

The extraction section 123 stores the marker IDs of the markers MK that are targets for supply of the superimposition information 7 in the extraction list 135 (step S13). First, a marker ID that is included in a request is stored in the extraction list 135. At this time, in a case where the marker ID included in the request is present in the extracted record, the extraction section 123 may cause the marker ID to be stored in the extraction list 135. In a case where the marker ID included in the request is not present in the extracted record, the extraction section 123 may transmit the details that there is no marker ID in the response transmitting section 125, or may cause the response 8b, which does not include the superimposition information 7 to be transmitted to the terminal 3.

Subsequently, the offline determining section 124 of the extraction section 123 determines whether or not a subsequent marker MK is present in the offline 1b area (step S14). The offline determining section 124 checks whether or not "offline" appears on the network of the subsequent marker MK (marker ID) according to the sequence, with reference to the marker table 134. In a case where "offline" appears on the network, the offline determining section 124 determines that a subsequent marker MK is present in the offline 1b area.

In a case where the offline determining section 124 determines that a subsequent marker MK is present in the offline 1b area ("YES" in step S14), the extraction section 123 acquires the subsequent marker ID as the marker ID of the marker MK that is the target to be supplied with the subsequent marker ID, and the process returns to step S13. Then, the extraction section 123 stores the marker ID in the extraction list 135. In a record of the subsequent marker IDs, the processes of steps S13 and S14 are repeated until "online" appears on the network.

In a case where the offline determining section 124 determines that the subsequent marker MK is not present in the offline 1b area ("NO" in step S14), that is, in a case where the offline determining section 124 determines that the subsequent marker MK is present in the online 1a area, the response transmitting section 125 creates a response using the defined superimposition information table 136 based on the extraction list 135 and transmits the response to the terminal 3 (step S15). In the defined superimposition information table 136, the superimposition information 7 associated with each marker ID illustrated in extraction list 135 is transmitted to the terminal 3.

After transmission of the superimposition information 7 to the terminal 3 by the response transmitting section 125, the request receiving section 122 determines whether or not an end instruction is received from the terminal 3 (step S16). In a case where the request receiving section 122 determines that the end instruction has not been received from the terminal 3 ("NO" in step S16), step S11 is executed. In a case where the request receiving section 122 determines that the end instruction has been received ("YES" in step S16), the information supplying unit 120 ends the information supplying process.

Figure 11C:
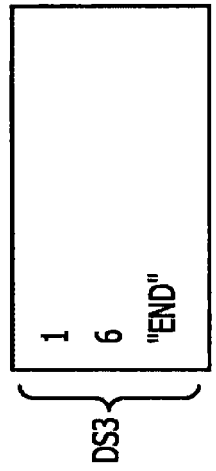
FIGS. 11A, 11B and 11C are diagrams illustrating examples of data that is retained in the terminal.
Figure 11B:
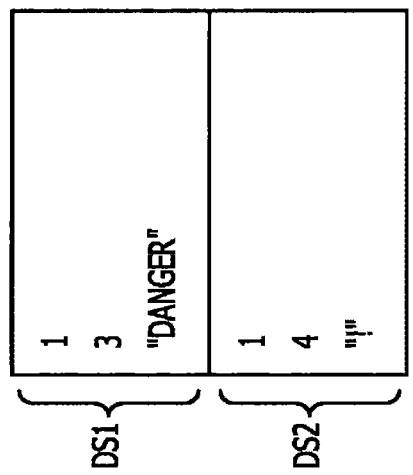
Figure 11A:
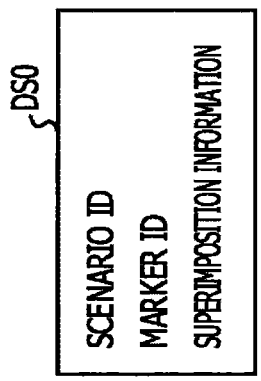

Next, the server apparatus 100 is described with reference to FIGS. 11A to 13. First, FIGS. 11A, 11B and 11C are diagrams illustrating examples of data that is retained in the terminal. FIG. 11A illustrates an example of a data structure. In a case where the superimposition information 7 corresponding to a marker ID other than the requested marker ID is included in the response 8b received from the server apparatus 100, the terminal 3 retains the superimposition information 7 using a data structure DS0 as illustrated in FIG. 11A in the memory 32.

A scenario ID, a marker ID, and superimposition information are retained by the data structure DS0 in this sequence, which configures a dataset. the superimposition information in the data structure DS0 may store the entity of the superimposition information 7 or may be a pointer to an address in the memory 32 where the superimposition information 7 is retained. According to the present embodiment, the data structure DS0 is used to store the superimposition information 7 corresponding to the markers MK disposed in the offline 1b area.

FIG. 11B is an example of the data in a case where the terminal 3 detects the marker ID "2" of the marker MK2 in the route A of FIG. 5 and the server apparatus 100 causes the superimposition information 7 to be downloaded to the terminal 3 in accordance with the extraction list 135 illustrated in FIG. 8B.

In FIG. 11B, two datasets DS1 and DS2 are configured in the memory 32 after being downloaded. In the first dataset DS1, the scenario ID "1", marker ID "3", and text "danger" as the superimposition information 7 are retained. In addition, in the second dataset DS2, the scenario ID "1", marker ID "4", and text "!" as the superimposition information 7 are retained.

In a case where the terminal 3 detects the marker ID "3" of the marker MK3 in the offline 1b area, the terminal 3 reads out the text "danger" from DS1 retained in the memory 32 and superimposes the text "danger" on the image displayed on the display operation unit 33. Similarly, in a case where the terminal 3 detects the marker ID "4" of the marker MK4 in the offline 1b area, the terminal 3 reads the text "!" from DS2 retained in the memory 32 and superimposes the text "!" on the image displayed on the display operation unit 33.

FIG. 11C is an example of data in a case where the terminal 3 detects the marker ID "5" of the marker MK5 in the route A of FIG. 5 and the server apparatus 100 causes the superimposition information 7 to be downloaded to the terminal 3 in accordance with the extraction list 135 illustrated in FIG. 8C.

In FIG. 11C, one dataset DS3 is configured in the memory 32 through the download. In the dataset DS3, the scenario ID "1", marker ID "6", and text "end" are retained as the superimposition information 7.

In a case where the terminal 3 detects the marker ID "6" of the marker MK6 in the offline 1b area, the terminal 3 reads out the text "end" from DS3 retained in the memory 32 and superimposes the text "end" on the image displayed on the display operation unit 33.

Figure 12:
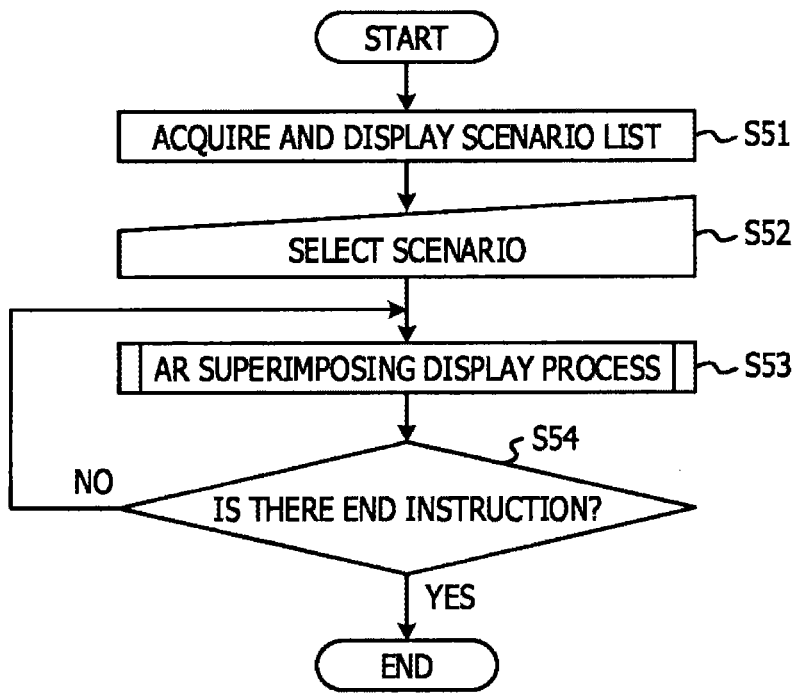
FIG. 12 is a flowchart diagram illustrating an outline of the process in the terminal.

A process in the terminal 3 according to the present embodiment is described with reference to FIGS. 12 and 13. FIG. 12 is a flowchart diagram illustrating an outline of the process in the terminal. In FIG. 12, the CPU 31 of the terminal 3 acquires a scenario list from the server apparatus 100 and displays the scenario list on the display operation unit 33 in accordance with a user's operation (step S51). The server apparatus 100 creates the scenarios list and transmits the scenario list to the terminal 3 in accordance with the scenario table 132 illustrated in FIG. 6. A scenario ID, a scenario name, and details are included in the scenario list. The scenario list is displayed on the display operation unit 33 of the terminal 3.

A user of the terminal 3 selects one scenario from the scenario list displayed on the display operation unit 33 (step S52). When the user selects a scenario, the CPU 31 of the terminal 3 transmits the scenario ID to the server apparatus 100.

After the selection of the scenario, the CPU 31 of the terminal 3 performs an AR superimposing display process when the marker ID is detected (step S53). After the AR superimposing display process, the CPU 31 determines whether or not an end instruction has been received from the user (step S54). In a case where the end instruction has not been received ("NO" in step S54), the CPU 31 returns to step S53, and the terminal 3 performs the AR superimposing display process in a case where the marker ID has been detected. In a case where the end instruction has been received ("YES" in step S54), the CPU 31 ends the process in the terminal 3.

Figure 13:
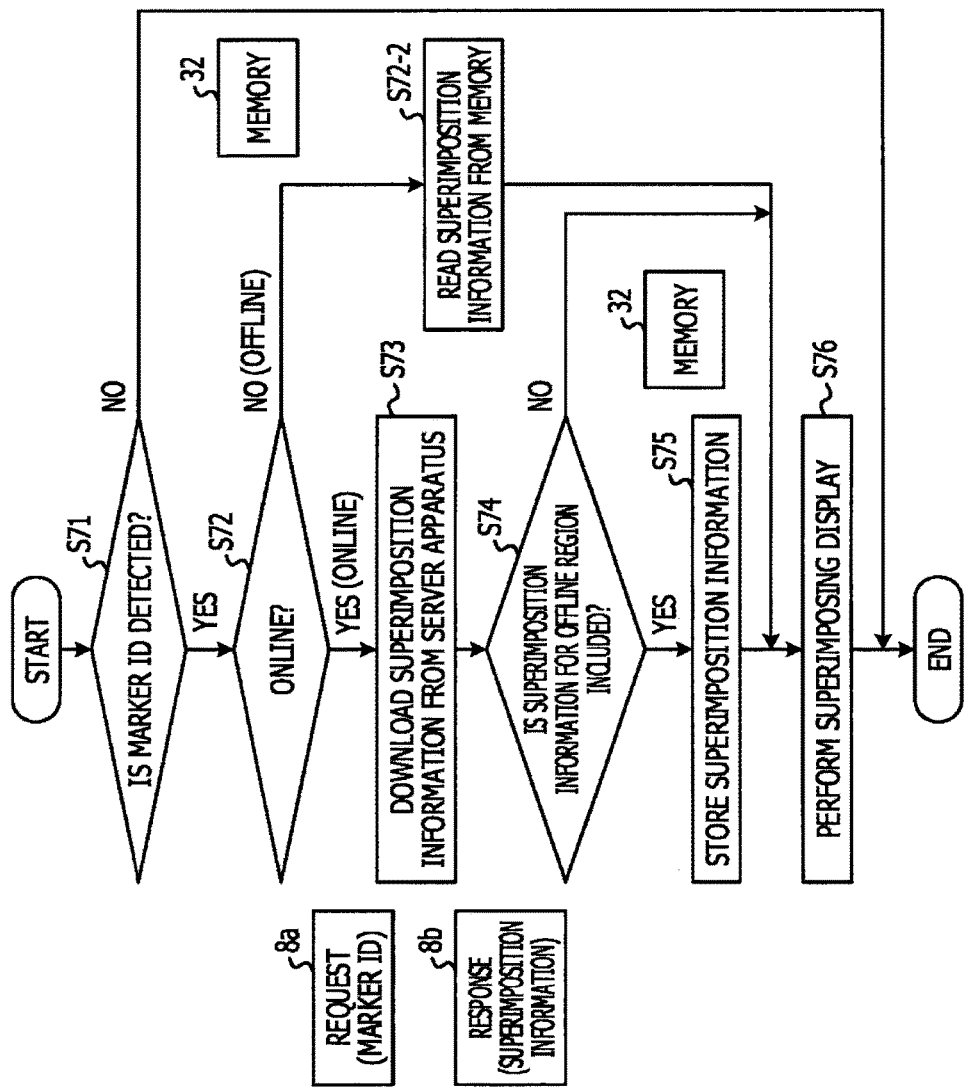
FIG. 13 is a flowchart diagram illustrating an AR superimposing display process in step S53 of FIG. 12.

FIG. 13 is a flowchart diagram illustrating the AR superimposing display process in step S53 of FIG. 12. In the AR superimposing display process illustrated in FIG. 13, the CPU 31 of the terminal 3 determines whether or not the marker ID has been detected (step S71). The CPU 31 may determine the detection of the marker ID based on an event from the imaging unit 34. In a case where the marker ID has not been detected ("NO" in step S71), the CPU 31 ends the AR superimposing display process.

In a case where the marker ID has been detected ("YES" in step S71), the CPU 31 determines whether or not the terminal 3 is present in the online is area (step S72). It may be determined whether the terminal 3 is present in the online 1a area or in the offline 1b area in accordance with an intensity of radio waves detected by the wireless communication unit 35.

In a case where the CPU 31 determines that the terminal 3 is present in the offline 1b area, the CPU 31 of the terminal 3 downloads the superimposition information 7 from the server apparatus 100 (step S73). Specifically, the CPU 31 transmits the request 8a (FIG. 1) that includes the marker ID detected in step S71, to the server apparatus 100 by the wireless communication unit 35. The CPU 31 receives the response 8b that includes one or more items of superimposition information 7 from the server apparatus 100, and thereby downloads the superimposition information 7 to the terminal 3.

When the download is ended, the CPU 31 of the terminal 3 determines whether or not the superimposition information 7 for the offline is included in the response 8b (step S74). The CPU 31 may determine whether or not a piece of superimposition information 7 other than the superimposition information 7 of the marker ID detected in step S71 is included in the response 8b. In a case where the superimposition information 7 for the offline is not included in the response 8b (NO in step S74), the CPU 31 causes the superimposition information 7 corresponding to the marker ID detected in step S71 to be superimposed on the image displayed on the display operation unit 33, thereby performs the superimposing display (step S76), and ends the AR superimposing display process.

In a case where the superposition information 7 for the offline is included in the response 8b (YES in step S74), the CPU 31 of the terminal 3 causes the superposition information 7, which is included in the response 8b, other than the superposition information 7 of the marker ID detected in step S71 to be stored in the memory 32 using the data structure DS0 in FIG. 11A (step S75).

The CPU 31 of the terminal 3 causes the superposition information 7, which is included in response 8b, corresponding to the marker ID detected in step S71 to be superimposed on the image displayed on the display operation unit 33, thereby performs the superimposing display (step S76), and ends the AR superimposing display process.

According to the present embodiment described above, a case where a route is set for each scenario, that is, a case where a sequence in which the terminal 3 detects the marker ID is known is described. However, the present embodiment can be applied to a case where an area in which the markers MK are disposed is fixed in the offline 1b area. FIG. 14 is a diagram illustrating an example of supplying information to an offline area. FIG. 14 illustrates an example of fixed areas A, B, and C for each group of one or a plurality of markers MK in the offline 1b area.

Markers MK_L1, MK_L2, MK_L3, MK_L4, and MK_L5 are disposed in the online 1a. Markers MK_A1, MK_A2, and MK_A3, markers MK_B1 and MK_B2, and markers MK_C1, MK_C2, and MK_C3 are disposed in the offline 1b area.

In the offline 1b area, an area where the markers MK_A1 to MK_A3 are disposed is defined as the area A, an area where the markers MK_B1 and MK_B2 are disposed is defined as the area B, and an area where the markers MK_C1 to MK_C3 are disposed is defined as the area C.

In a case where the terminal 3 detects the marker MK_L1 in the online 1a area, the server apparatus 100 causes the superposition information 7 of the markers MK_A1 to MK_A3 in the area A, in addition to the superposition information 7 of the marker MK_L1, to be downloaded to the terminal 3.

In a case where the terminal 3 detects the marker MK_L2 in the online 1a, the server apparatus 100 causes the superposition information 7 of the markers MK_B1 and MK_B2 in the area B, in addition to the superposition information 7 of the marker MK_L2, to be downloaded to the terminal 3.

In a case where the terminal 3 detects the marker MK_L3 in the online 1a area, the server apparatus 100 causes the superposition information 7 of the markers MK_C1 to MK_C3 in the area C, in addition to the superposition information 7 of the marker MK_L3, to be downloaded to the terminal 3.

The server apparatus 100 may retain information in advance, in which it is defined in advance that the marker MK_L1 is closest to the area A, the marker MK_L2 is closest to the area B, and the marker MK_L3 is closest to the area C, out of the markers MK_L1 to MK_L5 in the online 1a area.

As described above, according to the present embodiment, the server apparatus 100 can control causing the terminal 3 to acquire the information corresponding to the marker in the outside the radio zone (offline 1b area), immediately before the terminal 3 reaches the outside of the radio zone (offline 1b area).

Since the terminal 3 performs only the transmission of the detected marker ID of the marker MK to the server apparatus 100, a specific process, such as supplying positional information using GPS to determine whether or not it is immediately before the terminal 3 reaches the outside of the radio zone (offline 1b area) by the server apparatus 100 may not be performed.

In addition, the server apparatus 100 can control the download of the superposition information 7 to the terminal 3 through a simple process to determine being the offline in accordance with receiving the marker ID from the terminal 3.

According to the present embodiment described above, the server apparatus 100 may cause the superposition information 7 corresponding to the marker MK in the offline 1b to be downloaded to the terminal 3 within an amount of data transmission corresponding to the communication speed with the terminal 3. In a case where the superposition information 7 is an image and the communication speed is lower than a reference communication speed, the image may be changed into explanatory text that has a smaller information quantity and corresponds to the image. Otherwise, the server apparatus 100 may cause preset default superposition information 7 corresponding to any communication speed to be downloaded to the terminal 3.

The invention is not limited to the present embodiments disclosed specifically, and may be modified or changed in various manners without departing from the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system, comprising:
    circuitry configured to:
        acquire first display information corresponding to a first object included in image data captured by an apparatus;
        determine whether second display information, corresponding to a group of objects which are not included in the image data captured by the apparatus and are identified as objects expected to be detected after the first object is detected, is to be provided to the apparatus based on identification information corresponding to the first object and stored scenario data corresponding to the identification information;
        acquire the second display information corresponding to each of the objects included in the group of objects when it is determined that the second display information is to be provided to the apparatus; and
        transmit, to the apparatus, the first display information corresponding to the first object and the second display information corresponding to the group of objects.

2. The system according to claim 1, wherein the circuitry is configured to determine to provide the second display information when it is determined that the group of objects is located outside a communication range of a wireless network.

3. The system according to claim 1, wherein the circuitry is configured to store position information indicating whether the group of objects is outside a communication range of a wireless network.

4. The system according to claim 3, wherein the circuitry is configured to determine to provide the second display information to the apparatus when the stored position information indicates that the group of objects is outside the communication range of the wireless network.

5. The system according to claim 1, wherein the circuitry is configured to identify the group of objects as objects expected to be detected after the first object is detected based on sequential information indicating a sequence of a plurality of objects including at least the first object and the group of objects.

6. The system according to claim 5, wherein the circuitry is configured to determine to provide the second display information to the apparatus when the sequential information indicates that the group of objects follow the first object in the sequence.

7. The system according to claim 5, wherein the circuitry is configured to identify one set of sequential information among a plurality of sets of sequential information.

8. The system according to claim 7, wherein each set of the sequential information indicates a different sequence of the plurality of objects.

9. The system according to claim 7, wherein each set of the sequential information corresponds to a different route traversed by the apparatus.

10. The system according to claim 1, wherein the circuitry is configured to identify a second object that is expected to be detected after the group of objects.

11. The system according to claim 10, wherein the circuitry is configured to determine whether third display information corresponding to the second object, which is not included in the image data captured by the apparatus, is to be provided to the apparatus.

12. The system according to claim 11, wherein the circuitry is further configured to:
acquire the third display information corresponding to the second object when it is determined that the third display information is to be provided to the apparatus; and
transmit, to the apparatus, the first, second and third display information corresponding to the first object, the group of objects and the second object.

13. The system according to claim 1, wherein the circuitry is further configured to:
acquire display information corresponding to each object of the group of objects when it is determined that the second display information is to be provided to the apparatus; and
transmit, to the apparatus, the first display information corresponding to the first object and the display information corresponding to the group of objects.

14. The system according to claim 1, wherein the system is a server.

15. The system according to claim 14, wherein the server comprises:

a communication interface configured to receive the image data from the apparatus and transmit the first and second display information to the apparatus, and
a memory configured to store position information indicating whether the group of objects is outside a communication range of a wireless network.

16. The system according to claim 1, further comprising:
the apparatus, wherein
the apparatus includes:
an image capture device configured to capture the image data;
a communication interface configured to receive the first and second display information; and
a display configured to display the second display information when the group of objects is detected in another image data captured by the image capture device.

17. A non-transitory computer-readable medium storing a program, which when executed by a system, causes the system to:
acquire first display information corresponding to a first object included in image data captured by an apparatus;
determine whether second display information, corresponding to a group of objects which are not included in the image data captured by the apparatus and are identified as objects expected to be detected after the first object is detected, is to be provided to the apparatus based on identification information corresponding to the first object and stored scenario data corresponding to the identification information;
acquire the second display information corresponding to each of the objects included in the group of objects when it is determined that the second display information is to be provided to the apparatus; and
transmit, to the apparatus, the first display information corresponding to the first object and the second display information corresponding to the group of objects.

18. A controlling method performed by a system, the controlling method comprising:
acquiring first display information corresponding to a first object included in image data captured by an apparatus;
determining, by circuitry, whether second display information, corresponding to a group of objects which are not included in the image data captured by the apparatus and are identified as objects expected to be detected after the first object is detected, is to be provided to the apparatus based on identification information corresponding to the first object and stored scenario data corresponding to the identification information;
acquiring the second display information corresponding to each of the objects included in the group of objects when it is determined that the second display information is to be provided to the apparatus; and
transmitting, to the apparatus, the first display information corresponding to the first object and the second display information corresponding to the group of objects.

19. The system according to claim 1, wherein the stored scenario data further corresponds to the group of objects.

* * * * *